US010523708B1

(12) United States Patent
Ilincic et al.

(10) Patent No.: US 10,523,708 B1
(45) Date of Patent: Dec. 31, 2019

(54) SYSTEM AND METHOD FOR SECOND FACTOR AUTHENTICATION OF CUSTOMER SUPPORT CALLS

(71) Applicant: Capital One Services, LLC, McLean, VA (US)

(72) Inventors: Rajko Ilincic, Annandale, VA (US); Kaitlin Newman, Washington, DC (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/357,266

(22) Filed: Mar. 18, 2019

(51) Int. Cl.
H04L 29/06 (2006.01)
G06F 21/44 (2013.01)
(Continued)

(52) U.S. Cl.
CPC ............ *H04L 63/18* (2013.01); *H04L 9/3242* (2013.01); *H04L 63/0853* (2013.01);
(Continued)

(58) Field of Classification Search
CPC ... G06F 21/31; G06F 21/44; H04L 2463/082; H04L 63/08
See application file for complete search history.

(56) References Cited

U.S. PATENT DOCUMENTS 4,827,113 A 5/1989 Rikuna
4,910,773 A 3/1990 Hazard et al.
(Continued)

FOREIGN PATENT DOCUMENTS

CA 3010336 A1 7/2017
CN 101192295 A 6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Izunna Okeke

(57) ABSTRACT

A system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication via a backchannel to reduce the potential for malicious third-party impersonation of the client prior to transfer of the call to the customer call center. Pre-authorized customer support calls may be intelligently and efficiently routed directly to call center agents, without incurring further delay. During call handling, call center agents may initiate further client authentication processes, including contactless card authentication requests, over one or more different communication channels for authorizing access to sensitive information or to allay suspicion.

17 Claims, 13 Drawing Sheets

(51) Int. Cl.
 *H04W 12/06* (2009.01)
 *H04M 3/51* (2006.01)
 *H04L 9/32* (2006.01)
(52) U.S. Cl.
 CPC ......... *H04M 3/5175* (2013.01); *H04W 12/06* (2013.01); *H04L 2463/082* (2013.01)

(56) References Cited

U.S. PATENT DOCUMENTS

| | | |
|---|---|---|
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,960,411 A | 9/1999 | Hartman et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 * | 5/2008 | Owen ............. G06F 21/31 713/182 |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |

(56) References Cited

U.S. PATENT DOCUMENTS

| | | |
|---|---|---|
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0208449 A1 | 11/2003 | Diao |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0156026 A1 | 7/2005 | Ghosh et al. |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1* | 4/2008 | Kulkarni ................ H04L 63/08 726/9 |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1* | 5/2008 | Dispensa ............ H04L 63/0869 726/7 |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |

(56) References Cited

U.S. PATENT DOCUMENTS

| | | |
|---|---|---|
| 2010/0036769 A1 | 2/2010 | Winters et al. |
| 2010/0078471 A1 | 4/2010 | Lin et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1* | 10/2010 | McClain .............. G06F 21/43 713/155 |
| 2010/0312634 A1 | 12/2010 | Cervenka |
| 2010/0312635 A1 | 12/2010 | Cervenka |
| 2011/0035604 A1 | 2/2011 | Habraken |
| 2011/0060631 A1 | 3/2011 | Grossman et al. |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0026229 A1 | 1/2013 | Jarman et al. |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0303085 A1 | 11/2013 | Boucher et al. |
| 2013/0304651 A1 | 11/2013 | Smith |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0089586 A1 | 3/2015 | Ballesteros |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0339474 A1 | 11/2015 | Paz et al. |
| 2015/0371234 A1 | 12/2015 | Huang et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |

(56) References Cited

U.S. PATENT DOCUMENTS

| | | |
|---|---|---|
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Levin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ieff.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://st.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple.DES, 2 pages.

Song F., and Yun, A.I., "Quantum Security of NMAC and Related Constructions—PRF domain extension against quantum attacks",

(56) References Cited

OTHER PUBLICATIONS

IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Plafform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

\* cited by examiner

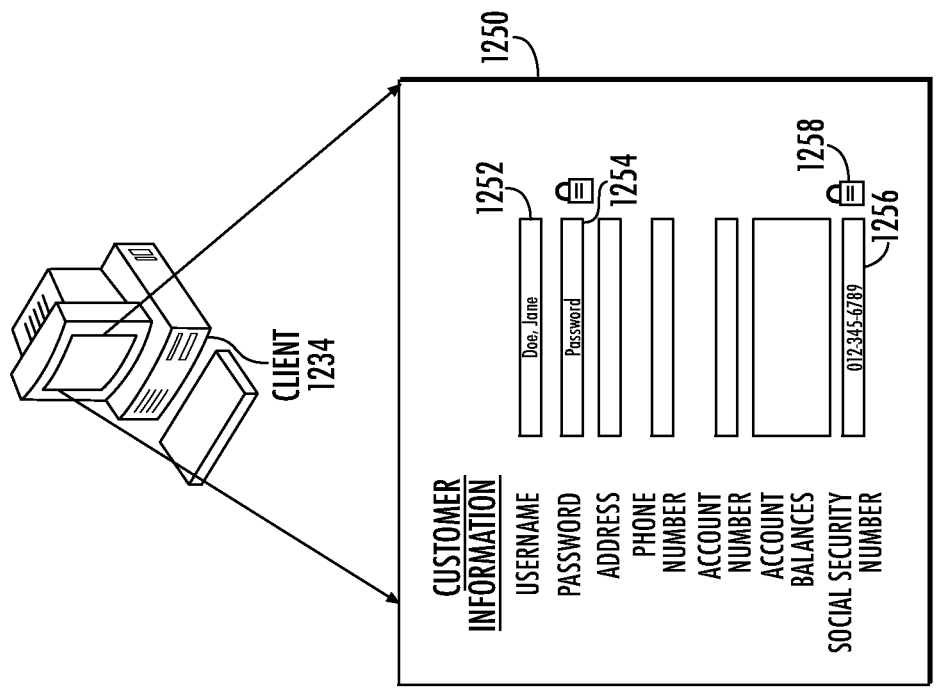
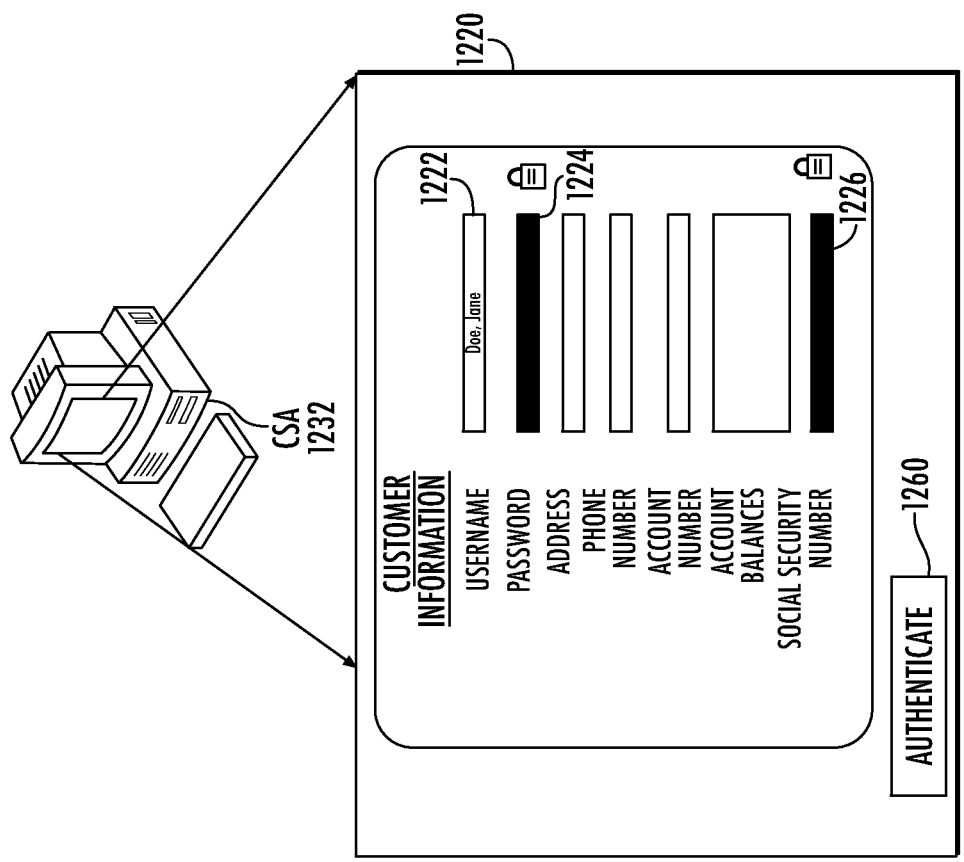

SYSTEM AND METHOD FOR SECOND FACTOR AUTHENTICATION OF CUSTOMER SUPPORT CALLS

BACKGROUND

Call center services are typically provided by service providers to enable clients to access, modify, delete or otherwise control their accounts. From a security standpoint call centers can be the riskiest areas of an enterprise because call center transactions may expose sensitive customer information to malicious third parties. Up to 90% of the calls received on any given day at customer call centers are from fraudulent callers attempting to improperly gain access to customer accounts.

To address these security concerns, the Payment Card Industry Security Standards Council (PCI SSC) manages the ongoing evolution of the Payment Card Industry (PCI) security standards. Service providers are responsible for enforcing compliance with PCI standards to protect sensitive customer data. For example, the PCI standards may dictate authentication standards to be followed prior to permitting a client to access and/or modify customer account information. Call centers may require client authentication in the form of exchange of passwords, answers to personal questions, biometric data or the like. However, authentication techniques are often undesirably subject to issues such as "spoofing" and "phishing" where imposters mask or modify incoming numbers, email addresses, IP addresses, etc., to pose as clients in an attempt to steal information or funds. External risks are also posed by hackers that monitor service provider communications, in particular, call center communications, for the purpose of stealing customer information.

SUMMARY

According to one aspect, a device for authenticating information access requests includes a customer service interface configured to receive an authentication request from a customer service agent, where the authentication request may be associated with an access request received by the customer service agent from a device of a client over a first communication channel. The authentication request may be used to determine whether the device is authorized to access information sought by the access request. The device further includes a storage device configured to store client data comprising pre-verified contact information for the client, a client interface configured to push a second factor authentication request to the client over a second communication channel established using the pre-verified contact information. The client interface may also be configured to receive an authentication response from the client. The second communication channel may be different from the first communication channel. The device includes an authentication server, coupled to the customer service interface and client interface, for generating the second factor authentication request, and, in response to a match between the authentication response and the stored client data, for selectively unlocking access to the information sought by the access request.

According to another aspect, a method for authenticating access requests received by customer service agents includes the step of receiving an authentication request from a customer service agent, where the authentication request is associated with an access request received by the customer service agent from a device of a client over a first communication channel. The authentication request may be used to determine whether the device may access information sought by the access request. The method includes the steps of retrieving client data including pre-verified contact information for the client from a data store and pushing an authentication request to the device over a second communication channel using the pre-verified contact information. The authentication request may comprise a request for a second factor authentication from the client. The method includes the steps of receiving a second factor authentication response from the device over the second communication channel, comparing the second factor authentication response to the client data and selectively authenticating the client in response to the step of comparing, including selectively unlocking access to the information sought by the access request.

According to a further aspect, a method for authenticating information access requests received by a customer service agent includes the steps of receiving an authentication request from a customer service agent, the authentication request associated with an access request received by the customer service agent over a first communication channel from a device of a client. The first communication channel may include a session identifier and the authentication request may be used to determine whether the device is permitted to access information sought by the client access request. The method includes the steps of retrieving pre-verified client contact information for the client from a data store and pushing an authentication request to the device using a second communication channel established using the pre-verified contact information, where the second communication channel may differ from the first communication channel. The authentication request may include a request for a cryptogram from a contactless card of the client, and the method includes the step of authenticating the access request including receiving the cryptogram from the client device over the second communication channel, decrypting the cryptogram using a copy of a key associated with the client to provide decrypted counter information, comparing the decrypted counter information to a copy of a counter maintained for the client, and selectively authenticating the client device in response to the step of comparing, including selectively unlocking access to the information. The method further includes the step of notifying the client of the access request using a third communication channel generated in response to the pre-validated contact information, wherein the third communication channel is different from both the first and second communication channels.

Using different communication channels for exchanging authentication information prior to allowing access to customer data decreases the potential for disclosure of sensitive customer information because malicious parties will be unable to interrupt all of the client communication interfaces.

BRIEF DESCRIPTION OF THE DRAWINGS

FIGS. 12A and 12B illustrate exemplary graphic user interface (GUI) content that may be displayed to a customer service agent and client in various embodiments.

DETAILED DESCRIPTION

Figure 1A:
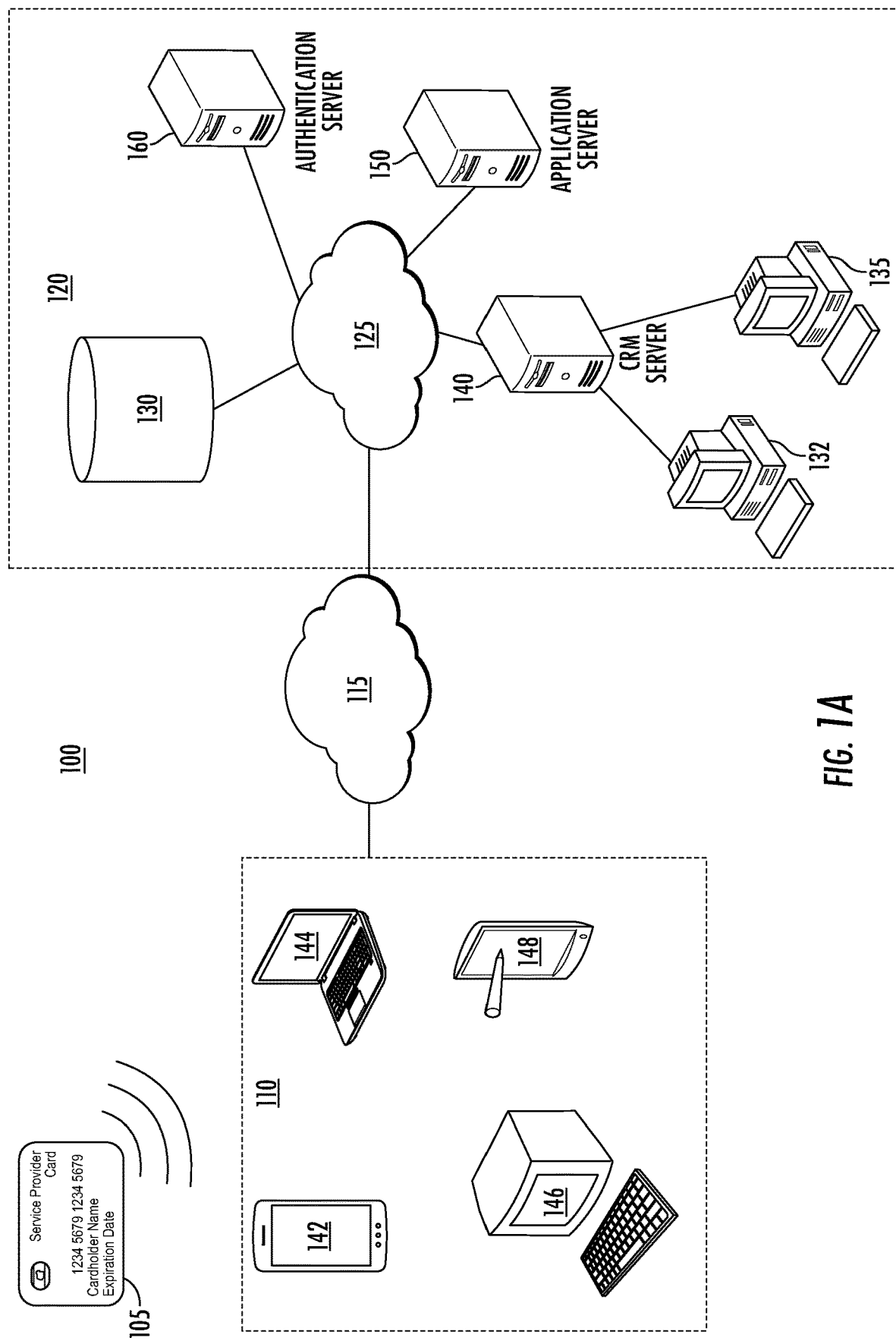
FIG. 1A is a block diagram of a data transmission system configured to pre-authenticate customer requests according to an example embodiment.

An objective of some embodiments of the present disclosure is the use of one or more keys that have been incorporated into one or more contactless cards as described in U.S. Patent Application(s) Ser. No. 16/205,119 filed Nov. 29, 2018 by Osborn, et. al, entitled "Systems and Methods for Cryptographic Authentication of Contactless Cards" and incorporated herein by reference (hereinafter the '119 Application). The contactless card may be used to perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the EMV protocol, which underlies many credit card transactions, includes an authentication process which suffices for operating systems for Android® but presents challenges for iOS,®, which is more restrictive regarding near field communication (NFC) usage, as it can be used only in a read-only manner. Unlike RFID which may be used to read devices in motion to at a significant distance. Exemplary embodiments of the contactless cards described in the '119 Application may utilize NFC technology.

Accordingly, a system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication to reduce the potential for malicious third-party impersonation of the client. Pre-authorized customer support calls are intelligently and efficiently routed in a manner that reduces the opportunity for malicious call interference and information theft.

According to another aspect, it is recognized that during handling of customer service requests it may be beneficial for a customer service representative to further authenticate the client. Such further authentication may be performed for a variety of reasons including prior to allowing modification of highly sensitive data, including passwords and contact information or allowing access to certain services, such as loan services and the like. Further authentication may also be desired in the event that a customer is transferred between customer service agents or a customer service agent becomes suspicious of the authenticity of the client that seeks access to client information.

According to one aspect, authentication may be performed using communication channels and protocols other than those that are used to request the information access. In some embodiments, the communication channels are established using client contact information that has been pre-validated by the service provider. In some embodiments, after access is granted, the client may be notified of such access using another communication method, such as email or text messaging. Using different communication channels and protocols for various stages of authentication limits the potential for malicious third-party interference because of the difficulties that would be faced by such party to simultaneously interfere with each of the communication mediums used for authentication.

These and other features of the invention will now be described with reference to the figures, wherein like reference numerals are used to refer to like elements throughout.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1A illustrates a system 100 including one or more client devices 110 coupled to a service provider 120 via a network 115. According to one aspect, the client devices 110 comprise network-enabled computers and communicate with the service provider 120 via networks 115 and 125 to access service provider content and services.

As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client devices 110 thus can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

One or more client devices 110 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Various client devices 110 of FIG. 1A include a cellular phone 142, a laptop 144, a tablet 148 and a terminal 146. Client devices 110 may include a thin client application specifically adapted for communication with the service provider 120. The thin client application may be stored in a memory of the client device and be operable when executed upon by the client device to control an interface between the client device and a service provider application, permitting a user at the client device to access service provider content and services.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

Service provider 120 is, in one embodiment, a business providing computer-based services to clients over a network 115. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server'. The servers may communicate over a private network 125 of the service provider, often referred to as a corporate or enterprise network. The private network 125 may comprise a wireless network, a wired network or any combination of wireless network and wired network as described above with regard to network 115.

In the system of FIG. 1A, service provider 120 is shown to include an application server 150, an authentication server 160, and a Customer Relationship Management (CRM) server 140. Although each server is illustrated as a discrete device, it is appreciated that the applications and servers may be distributed throughout the enterprise or, in the case of distributed resources such as 'cloud' resources, throughout the network 115. The application server 150 may support one or more application services provided by the service provider 120, for example account management services. The CRM server 140 may be used to provide customer support services to clients of the service provider 120, including the processing and forwarding of incoming calls from clients to one or more call handling agents at working at workstations 132, 135.

Database 130 comprises data storage resources that may be used, for example, to store customer account, credential and other authentication information for use by the application server 150 and the authentication server 160. The database 130 may be comprised of coupled data resources comprising any combination of local storage, distributed data center storage or cloud-based storage.

According to one aspect, a contactless card 105 may be in wireless communication, for example, near field communication (NFC), with one or more client devices 110. For example, contactless card 105 may comprise one or more chips, such as a radio frequency identification chip, configured to communicate via NFC or other short-range protocols. In other embodiments, contactless card 105 may communicate with client devices 110 through other means including, but not limited to, Bluetooth, satellite, and/or WiFi. As described in the '119 Application, contactless card 105 may be configured to communicate with one of a card reader terminal 146, a cellular phone 142, a laptop 144 and/or a tablet 148 through NFC when the contactless card 105 is within range of the respective client device. As will be described in more detail below, the contactless card 105 may include key and counter information that may be transformed using cryptographic algorithms to generate a cryptogram that may be used by the service provider to authenticate the client device.

Figure 1B:
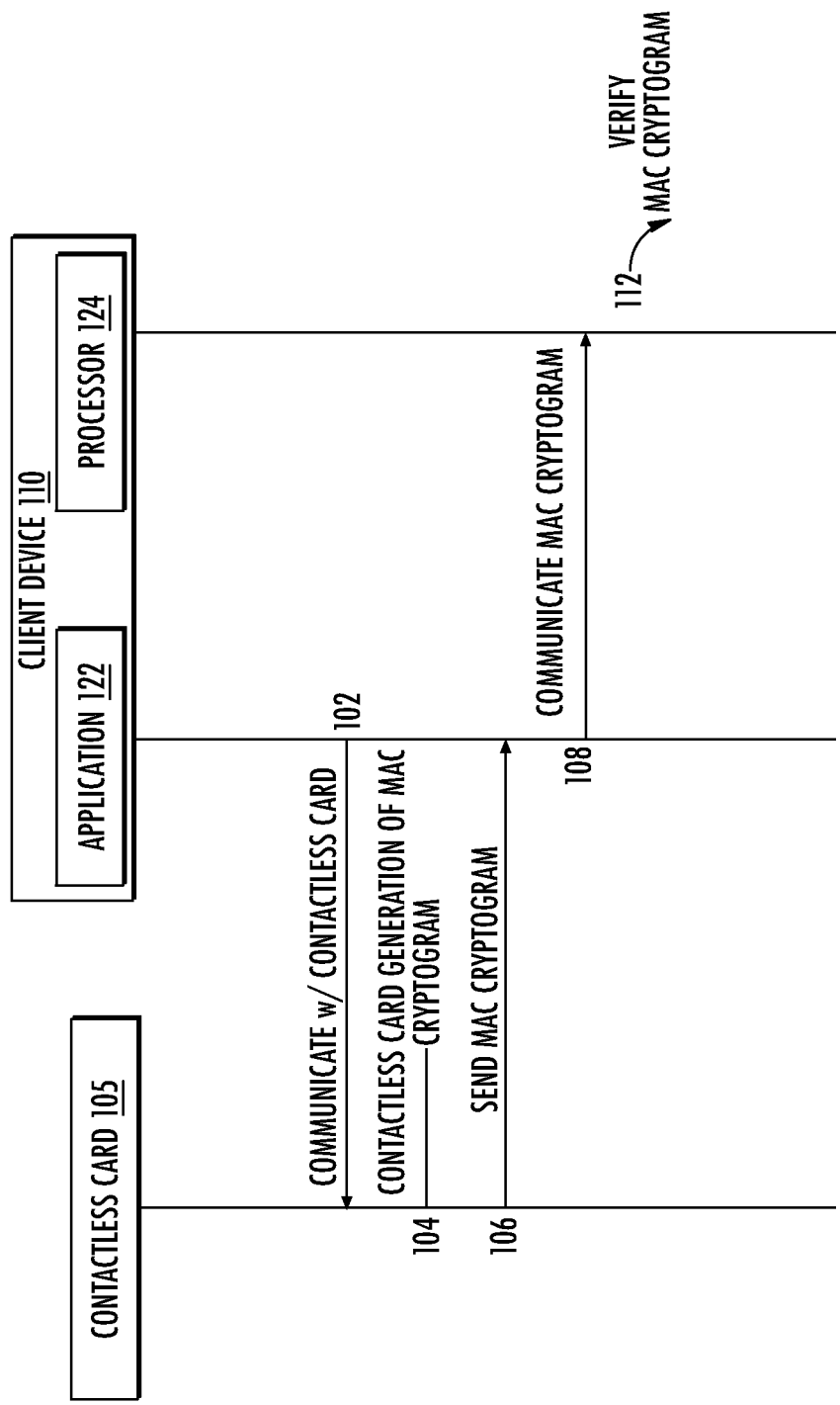
FIG. 1B is a diagram illustrating a sequence for providing authenticated access according to an example embodiment.

FIG. 1B is a timing diagram illustrating an example sequence for providing authenticated access according to one or more embodiments of the present disclosure. System 100 may comprise contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a service provider 120 in data communication with the client device 110 (as shown in FIG. 1A). For example, processor 124 may output the MAC cryptogram for transmission to service provider 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

More specifically, according to one aspect, a contactless card 105 may be used in conjunction with first authentication credentials provided to an application service provider to pre-authenticate a customer support request, prior to forwarding the support request to the CRM server 140. Pre-authentication of customer support requests in this manner provides a dual advantage; because authentication information is not forwarded to the CRM, the opportunity for misappropriation of such information by a call center agent is obviated. In addition, the use of the contactless card as a second factor of authentication enables the association of a particular device/phone number with a specific individual (i.e., the owner of the card), thereby removing the ability for a malicious third party to 'spoof', i.e., impersonate, the client. According to another aspect, pre-authentication communication protocols described below identify or use specific communication channels for call handling, thereby reducing the opportunity for client impersonation.

Example embodiments of systems and methods described herein may be configured to provide multi-factor security authentication which may be used to bypass authentication by CRM server 40, thereby reducing the potential for theft of sensitive customer information during call handling.

The security factor authentication may comprise a plurality of processes. A first authentication process may comprise logging in and validating a user via one or more applications executing on a device. A second authentication process may operate following successful login and validation to cause a user to engage in one or more behaviors associated with one or more contactless cards. In effect, the security factor authentication process comprises a multi-factor authentication process that may include both securely proving identity of the user and encouraging the user to engage in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

For example, to provide a first layer of authentication, a client may access the website of the service provider by linking to a service provider web page using an internet browser application executing on the client device. The browser is a software application such as Google® Chrome®, Internet Explorer®, Safari®, etc., and includes programming code for translating Hypertext Markup Language (HTML) web pages of the service provider application to a format suitable for to a client operating the client device. As part of accessing the service provider website, the service provider may request first authorization information, including password information, answers to pre-stored queries, biometric information, an image, or other mechanism of verifying that a user of the client device is authorized to access content and services, including accounts, managed by the service provider.

Certain high-risk services of provided by the service provider, such as call center support, may benefit from multi-factor authentication. For example, service providers may store first level authentication information within a client's browser as a cookie to speed up authentication processes during client login. Browser cookies, and the associated password or other data, are vulnerable to discovery and misuse. Thus, prior to allowing the user to access or modify highly sensitive or personal information, as can happen during customer support calls, it is important to validate that the user has the authority for the access.

According to one aspect, the contactless card 105 may be used to provide a second authentication for a user of a client device. In one embodiment, and as described in more detail below, the contactless card includes a key, a counter, and cryptographic processing functionality that may be used to generate a cryptogram that may be used to validate a user of a client device. The counter advantageously reflects previous behaviors of the holder of the card. For example, the counter may reflect the number of times that the user has previously accessed a particular service of the service provider, information which is virtually impossible for a malicious third party to garner accurately.

According to one aspect, and as described in more detail below, cryptogram exchange occurs using backchannel communications, wherein for the purposes herein a 'backchannel' is a communication channel established between a client and an authentication server for exchange of authentication tokens. In some embodiments, the communication channel used for backchannel authentication is different from the application communication channel established between a service provider application server and a client. For example, communications between a client and a service provider over a service provider web interface may be authenticated using a backchannel call, text or email issued directly to a pre-validated client contact. In other embodiments, the communication channel may leverage information (such as session information) from the application communication channel when establishing the backchannel communication link.

When a client seeks access to a high-risk service, in some embodiments that service provides application may prompt the user to provide the second level of authentication using the contactless card 105, for example as mentioned above communicatively coupling the card 105 to one of the client devices 110 by tapping or otherwise.

Following the second authentication, and as will be described in more detail below, the service provider returns data to the client device. The data may include data allowing the client to initiate a communication link with the CRM server 140. Such data may include contact information, such as a link to a CRM service provider application, or a phone number for a call center. In some embodiments, the contact information may be augmented with control information for the CRM or call center. For example, control information may direct the CRM or call center to bypass any authentication or Interactive Voice Response (IVR) processes typically performed at the call center to account for the fact that the client has already been pre-authenticated by the service provider application/contactless card multi-factor authentication process.

It should be noted that although in the above description the first authentication is described as using personal, biometric, questions or other authentication information, it is recognized that in some examples, a client application executing on a device may respond to a tap of a contactless card to initially activate or launch the application of the device. In such examples, both the first and second authentication processes use the key/counter contactless card authentication process described in more detail below. In some embodiments, if the client-side application is not installed on a client device, a tap of the contactless card proximate the card reader may initiate a download of the application, (such as navigation to a download page of the application). Subsequent to installation, a tap of the contactless card may activate or launch the application, and then initiate, for example via the application or other back-end communication), activation of the contactless card. In some examples, the one or more applications may be configured to determine that it was launched via one or more tap gestures of the contactless card, such that a launch occurred at 3:51 pm, that a transaction was processed or took place at 3:56 pm, in order to verify the identity of the user.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about the individual. The secondary information may comprise personally identifiable information about the user, including but not limited to social security information, query responses, passwords, account information and the like. In some examples, the secondary information may be stored within the contactless card.

Figure 2:
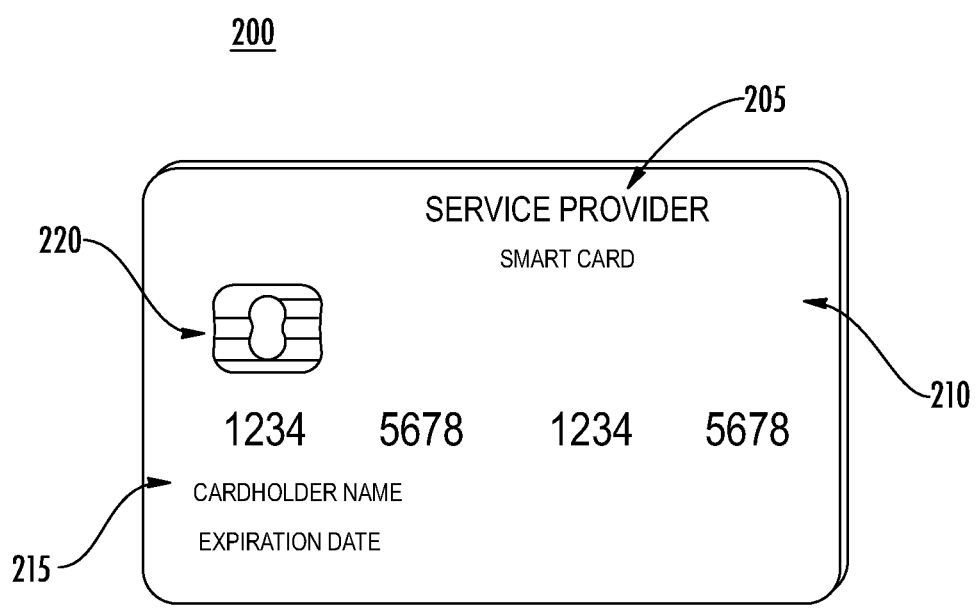
FIG. 2 is an example of a contactless card for storing authentication information that may be used in the system of FIG. 1A.

FIG. 2 illustrates one or more contactless cards 200, which may comprise a payment card, such as a credit card, debit card, or gift card, issued by a named service provider 205 displayed on the front or back of the card. In some examples, the contactless card 200 is not related to a payment card, and may comprise, without limitation, an identification card. In some examples, the payment card may comprise a dual interface contactless payment card. The contactless card 200 may comprise a substrate 210, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2. These components may be located behind the contact pad 220 or elsewhere on the substrate 210. The contactless card 200 may also include a magnetic strip or tape, which may be located on the back of the card (not shown in FIG. 2).

Figure 3:
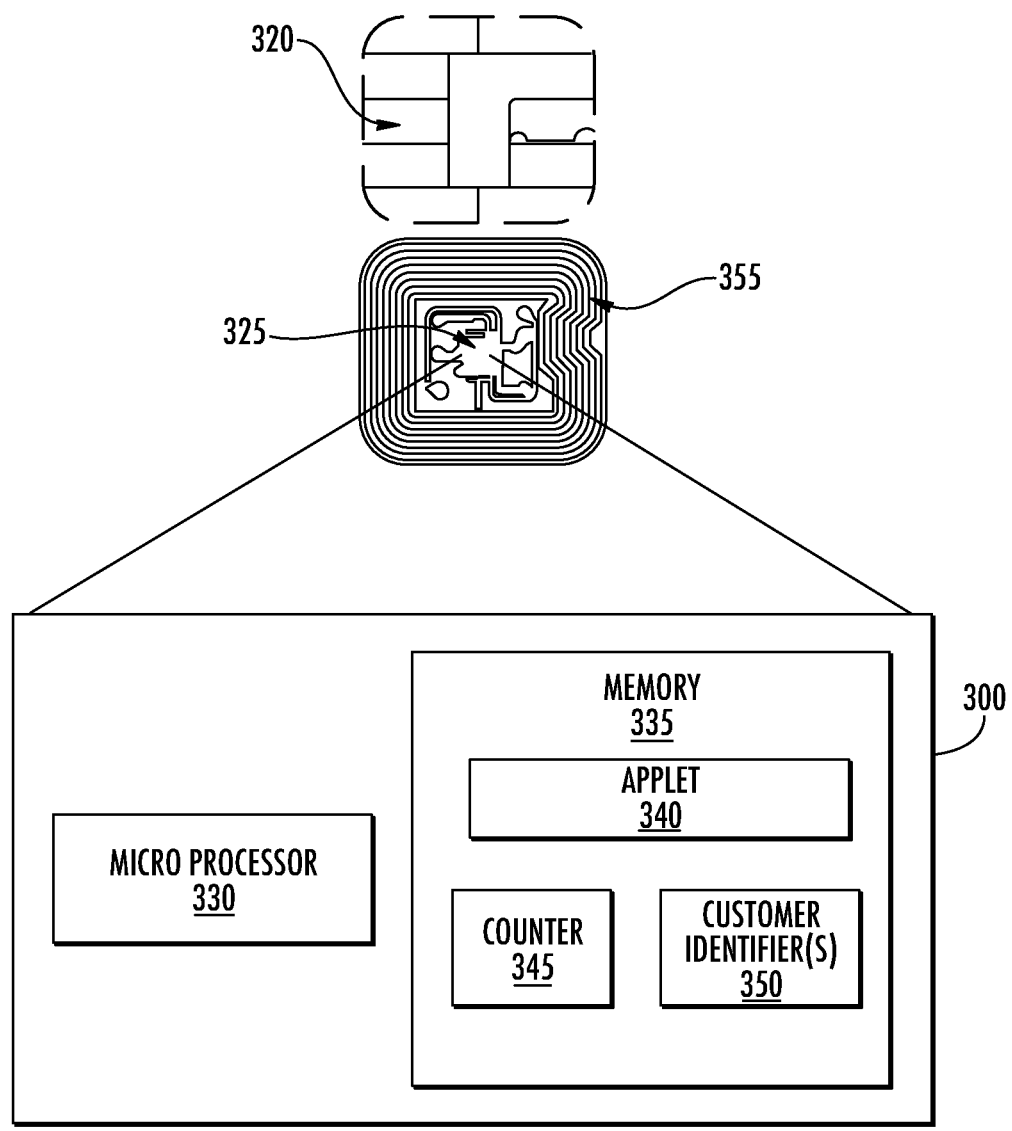
FIG. 3 is a detailed block diagram illustrating exemplary components of the contactless card of FIG. 2.

As illustrated in FIG. 3, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, and a customer identifier 350. The one or more applets 340 may comprise one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may comprise a numeric counter sufficient to store an integer. The customer identifier 350 may comprise a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may comprise one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 4:
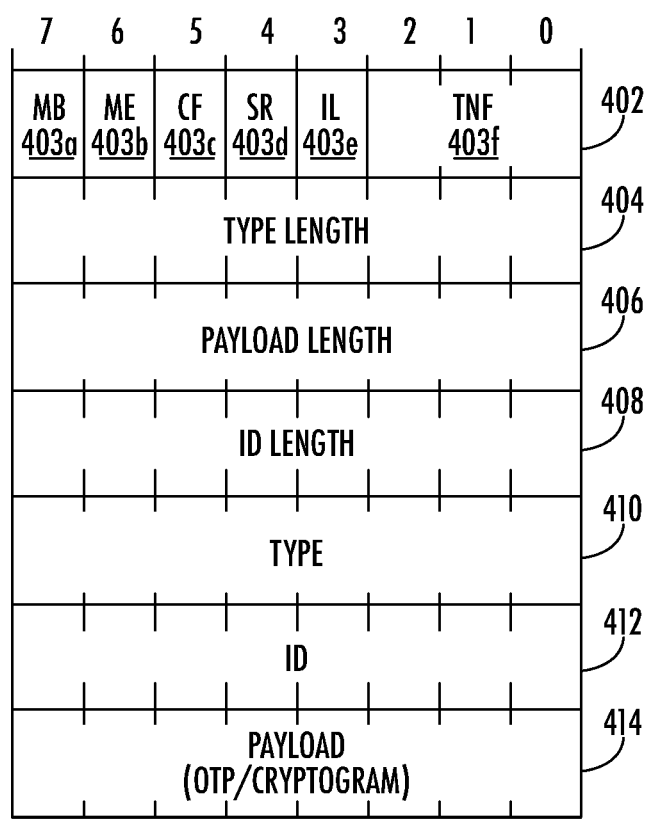
FIG. 4 is a diagram of exemplary fields of messages exchanged between a contactless card and a client device of FIG. 1A.

FIG. 4 illustrates an exemplary NDEF short-record layout (SR=1) 400 according to an example embodiment. An NDEF message provides a standardized method for a client device 110 to communicate with a contactless card 105. In some examples, NDEF messages may comprise one or more records. The NDEF record 400 includes a header 402 which includes a plurality of flags that define how to interpret the rest of the record, including a Message Begin (MB) flag 403*a* a Message End (ME) flag 403*b*, a Chunk flag (CF) 403*c*, a Short Record (SR) flag 403*d*, an ID Length (IL) flag 403*e* and a Type Name Format (TNF) field 403*f*. MB 403*a* and ME flag 403*b* may be set to indicate the respective first and last record of the message. CF 403*c* and IL flag 403*e* provide information about the record, including respectively whether the data is 'chunked' (data spread among multiple records within a message) or whether the ID length 408 is relevant. SR flag 403*d* may be set when the message includes only one record.

The TNF field 403*f* identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 404, payload length 406, ID length 408, Type 410, ID 412 and Payload 414. contains the length of the payload type in bytes. Type length field 404 specifies the precise kind of data found in the payload. Payload Length 406 contains the length of the payload in bytes. A record may contain up to 4,294,967,295 bytes (or $2^{32}-1$ bytes) of data. ID Length 408 contains the length of the ID field in bytes. Type 410 identifies the type of data that the payload contains. ID 412 provides the means for external applications to identify the whole payload carried within an NDEF record. Payload 414 comprises the message.

In some examples, data may initially be stored in the contactless card by implementing STORE DATA (E2) under a secure channel protocol. This data may include a personal User ID (pUID) that is unique to the card, as well as one or more of an initial key, cryptographic processing data including session keys, data encryption keys, random numbers and other values that will be described in more detail below. These values may be used to generate a message authentication code (MAC) that may be used to pre-authenticate a client prior to customer service handling.

Exemplary information that may be exchanged with the contactless card 105 and an authentication server 160 during initialization to populate the contactless card to support secure authentication according to various aspects are shown in Table I below.

TABLE I

| Item | Length (bytes) | Encrypted? | Notes |
| --- | --- | --- | --- |
| pUID | 8 | No | Unique Card ID |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

Following initialization both the contactless card and authentication server store information for uniquely identifying the cardholder. These features may be used according to one aspect to authenticate clients access to high-risk services as described below.

Figure 5:
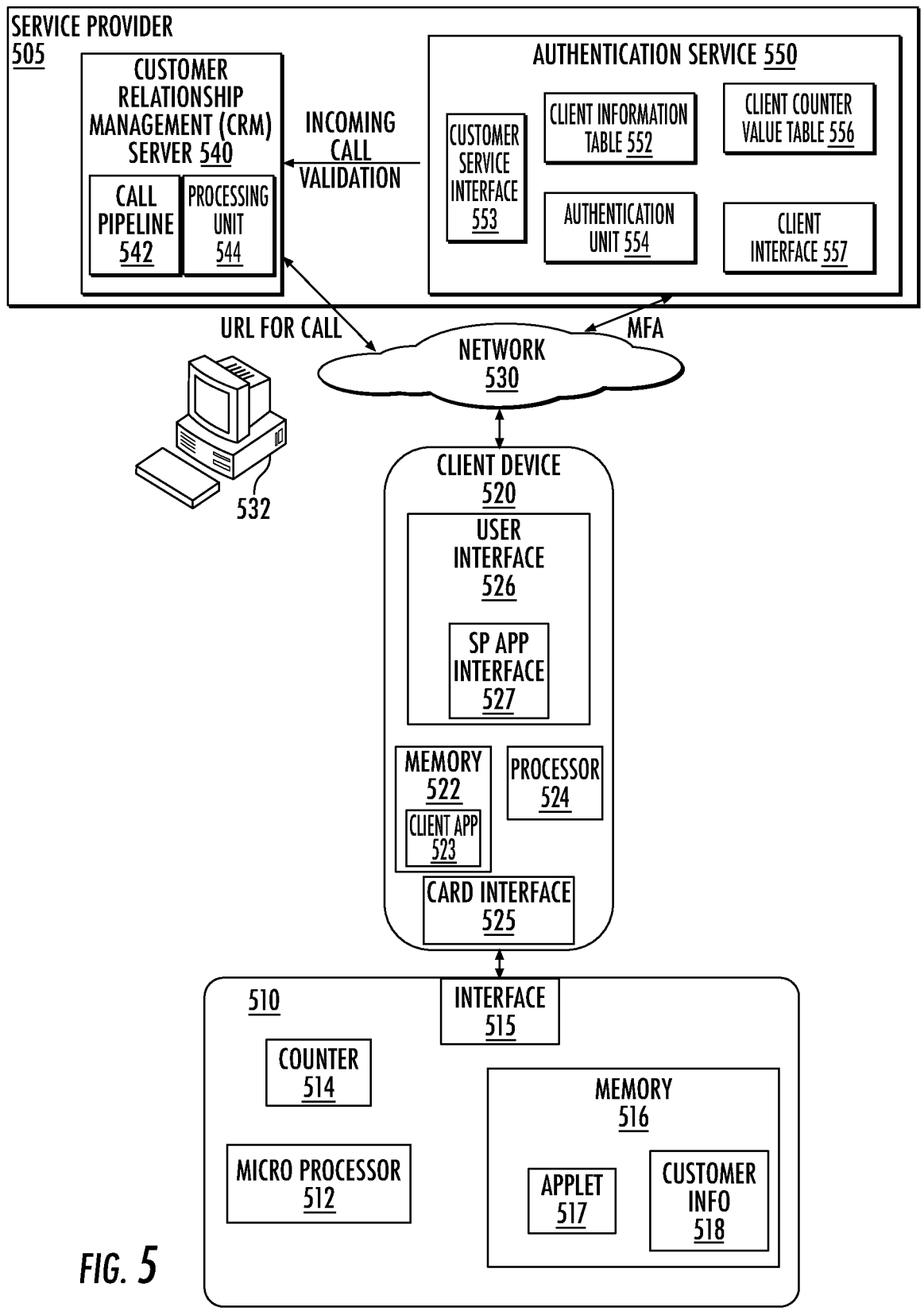
FIG. 5 a detailed block diagram of components of the system of FIG. 1A that may be utilized to support aspects of the invention.

FIG. 5 illustrates a communication system in which a contactless card 510 may store information such as that included in Table 1 may be used to authenticate a user prior to connecting the user with a high-risk service of the service provider. In one aspect, a 'high-risk service' is one which may benefit from multi-factor authentication processes due to the opportunity for the service to expose sensitive customer or other information. As described with regard to FIG. 3, each contactless card may include a memory 516 for storing customer information 518 including one or more uniquely identifying attributes, such as identifiers, keys, random numbers and the like. In one aspect, the memory further includes an authentication applet 517 operable when executed upon by microprocessor 512 for controlling authentication processes described herein. In addition, each contactless card 510 may include one or more application transaction counters (ATC) 514, and an interface 515. As described above, in one embodiment the interface operates NFC or other communication protocols.

Client device 520 also includes a card interface 525 for communicating with the contactless card, and one or more other network interfaces (not shown) that permit the client device 520 to communicate with a service provider using a variety of communication protocols as described above. The client device may further include a user interface 526, which may include one or more of a keyboard or touchscreen display, permitting communication between a service provider application and a user of the client device 520. Client device 520 further includes a memory 522 which stores information and program code controlling operation of the client device 520, including for example a client-side application 523 which may be provided to the client by a service provider to facilitate access to and use of service provider applications. In one embodiment, the client-side application 523 includes program code configured to communicate authentication information from the contactless card 510 to one or more services provided by the service provider. The client-side application 523 may be controlled via input received at a service provider (SP) application interface 527 displayed on user interface 526. For example, a user may select an icon, link or other mechanism provided as part of the SP application interface 527 to launch the client-side application to access SP application services.

As mentioned with regard to FIG. 1A, client device 520 may be connected to various services of provided by a service provider 505, including a Customer Relationship Manager (CRM) server 540 and an authentication server 550. In one embodiment, the CRM server 540 manages routing of received support calls and transfer of received calls to a call handling pipeline 542. Authentication server 550 includes a client information table 552 for storing information such as that of Table 1 for clients of a service provider. The authentication server 554 includes hardware and software for performing various authentication processes for clients using information from client counter value table 556. In one embodiment authentication server further is shown to include a client interface 557 for exchanging authentication messages with the client device and a customer service interface 553 for exchanging authentication messages with the CRM server 540. The authentication server may also include a client counter value table 556 which may be used as described below to perform authentication in conjunction with the contactless card 510.

Figure 6:
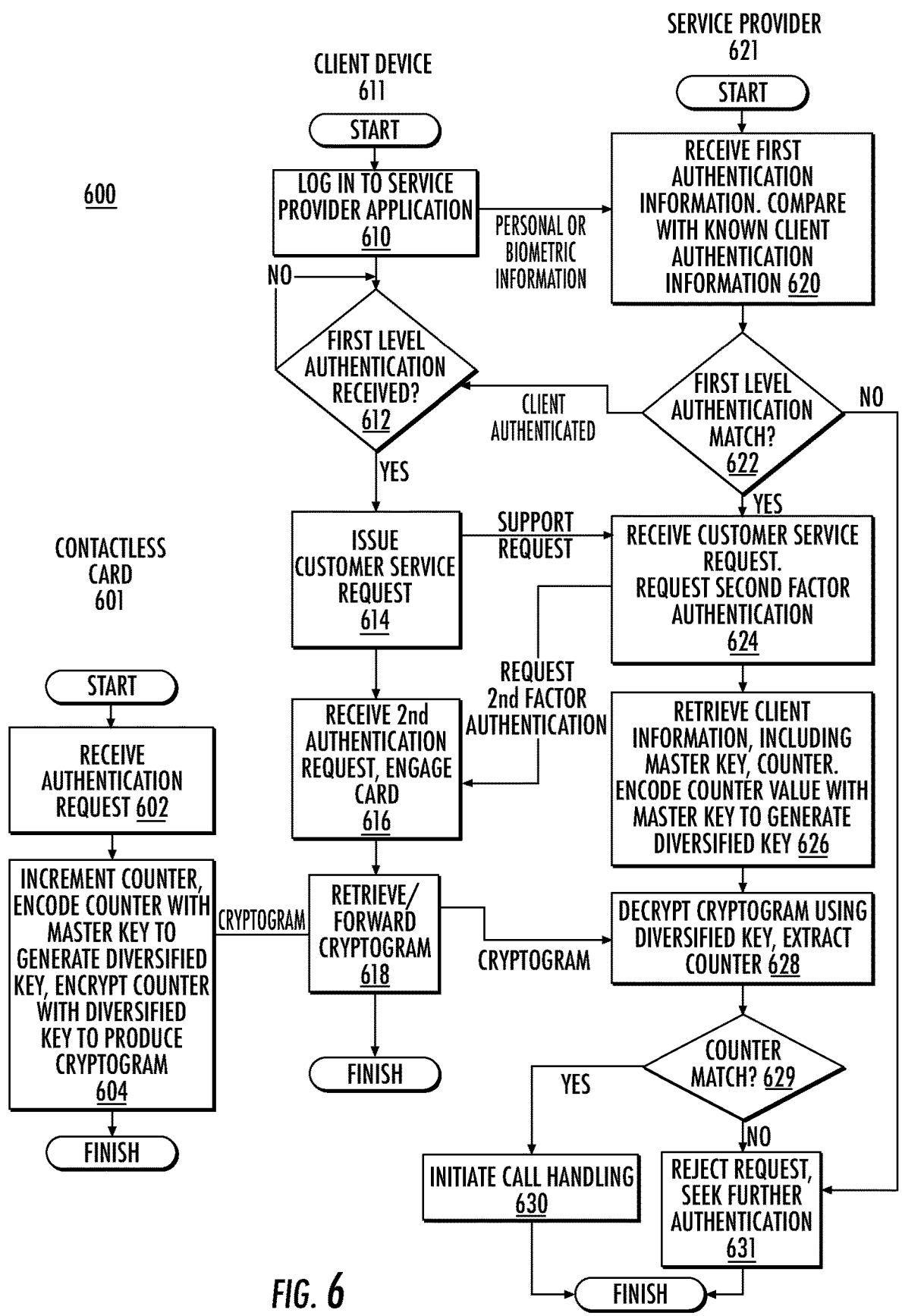
FIG. 6 is a data flow diagram provided to describe exemplary steps that may be performed in one embodiment by the components of FIG. 4 during call authentication according to aspects of the invention.

FIG. 6 illustrates various steps that may be performed by the contactless card 601, client device 611 and an authentication service of a service provider 621 which are configured to use key diversification techniques as part of a multi-factor authentication protocol for pre-authenticating clients. For example, a cardholder of contactless card 601 with access to a client device 611 may seek authentication from a service provider 621 to enable access to services, including seeking multi-factor authentication for access to high-risk services such as call center support.

At step 610, client device 611 first accesses a client account maintained by a service provider 621 by exchanging login credentials with the service provider, where the login credentials may include, but not be limited to, passwords, keys, biometric data, image data, query/response exchanges, etc. In one embodiment, the client may initiate this access by launching the client-side application via the SP application interface 527. Launching the app may include displaying a service provider web page configured to accept first credential information from the user.

In some embodiments, first level authentication may be performed using the cryptogram exchange process described below for second level authentication. The service provider app may be launched by tapping a contactless card 601 to the client device 611, initiating the cryptogram exchange as a precursor for permitting access to the service provider app.

The service provider receives the credentials at step 620 and compares these credentials against credentials for the client that are maintained by the authentication server. If the login credentials do not match at step 622, the service provider proceeds to step 631 to pursue authentication of the client device using other methods. If it is determined that there is a match at step 622, the client is authenticated, and the service provider coordinates with a client-side application maintained by client device 611 to display service provider web pages to the client to enable access to one or more services.

At step 614 the client device requests access to a high-risk application, for example, a customer service application. The client may request access, for example, by selecting one of a plurality of hyperlinks provided on a service provider website to direct the client to the selected service. The hyperlink may include, for example, a web address of a landing page for the service. Alternatively, the hyperlink may include a phone number of a customer support system.

Receiving the customer service request at step 624, the service provider determines that the selected service is a high-risk service that would benefit from a second level of authentication. For example, in an embodiment that provides second factor authentication using contactless cards, the service provider may prompt the client device to engage a contactless card to retrieve a cryptogram for verification purposes. The prompt may be any manner of indicating to the client that they should engage the contactless card, including textual prompts, visual prompts, audible prompts and other available indication mechanisms.

The client device 611 receives this request at step 616 and engages the contactless card. In one aspect, the client device uses NFC communication channels as described above to exchange messages with the contactless card the contactless card cooperates to provide second factor authentication through a combination of symmetric keys, symmetric cryptographic processing, and counters.

At step 602 the contactless card receives the authentication request. At step 604, processing components within the contactless card increment an application service transaction (AST) counter and encodes the counter using the Master Key stored in the contactless card using a symmetric cryptographic algorithm to produce a diversified key. The cryptographic algorithm may be selected from a group including at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES (Triple Data Encryption Algorithm) or Advanced Encryption Standard (AES) 128; a symmetric Hash Based Message Authentication (HMAC) algorithm, such as HMAC-SHA-256; and a symmetric cypher-based message authentication code (CMAC) algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

Processing components of contactless card may take the selected cryptographic algorithm, and using the master symmetric key, process the counter value. For example, the contactless card 601 may select a symmetric encryption algorithm and use a counter which increments with every authentication transaction processed by the contactless card. Contactless card 601 may then encrypt the counter value with the selected symmetric encryption algorithm using the master symmetric key to generate a diversified symmetric key.

In one aspect, the diversified symmetric key may be used to process the counter prior for transmission for authorization purposes. For example, the contactless card 601 may encrypt the counter value using a symmetric encryption algorithm and the diversified symmetric key, with the output comprising an encrypted MAC cryptogram. The contactless card 601 may then transmit the cryptogram to the service provider 621 for authentication. In some examples, the counter value may not be encrypted. In these examples, the counter value may be transmitted between the transmitting device 205 and the receiving device 210 at block 230 without encryption.

In one embodiment, a template for an authentication message comprising a cryptogram may comprise a first record, with a well-known index for providing the actual dynamic authentication data. Table II below is one example of an authentication message that may be exchanged between client device 611 and contactless card 601.

TABLE II

| Byte Index | Value | Comment |
|---|---|---|
| 00 | D1 | Header {MB, ME, CF, SR, IL, TNF} |
| 02 | 48 | Payload Length including record ID |
| 03 | 54 | T |
| 04 | 02 | Record ID |
| 05 | 65 6E | EN (Language) |
| 07 | 43 01 00 76 a6 62 7b 67 a8 cf bb <8 MAC bytes> | |

In one example, if additional tags are to be added, the first byte may change to indicate message begin, but not end, and a subsequent record may be added. Because ID length is zero, ID length field and ID are omitted from the record. An example message shown in Table III below may include: UDK AUT key; Derived AUT session key (using 0x1234); Version 1.0; pATC=0x1234; RND=76a6627b67a8cfbb; MAC=<eight computed bytes>. The first column may comprise address/index into the NDEF message data.

TABLE III

| Message Format | | | | |
|---|---|---|---|---|
| 1 | 2 | 4 | 8 | 8 |
| 0x43 (Message Type 'A') | Version | pATC | RND | Cryptogram A (MAC) |

At step 618 the client device 611 receives the cryptogram and forwards it to service provider 621. At step 626, after the service provider requests $2^{nd}$-factor authentication at step 624, in one embodiment an authentication server of the service provider 621 retrieves client information associated with a cardholder of the contactless card associated with an account of the client using the client device. The client information may include a Master Key of the client and a counter of application service transactions of the contactless card. The service provider 621 encodes the retrieved counter value using the Master Key and a cryptographic algorithm that matches the cryptographic algorithm used by the contactless card to produce a service provider copy of a diversified key.

At step 628, the service provider uses the diversified key to decrypt the cryptogram to expose the counter value forwarded by the contactless card. At step 629, the service provider compares the exposed counter to the counter retrieved by the service provider, which provides a second authentication of the user. If there is no match, the client is not granted access to the service, and at step 631 the service provider 621 may seek to authenticate the user using other methods. If at step 629 there is a match, then the service provider initiates call handling with a CRM server at 630. In one aspect, as will be described with regards to FIG. 7 and FIG. 8, the service provide may generate one or more messages for controlling one of the CRM or the client device to leverage pre-authentication already performed by the service provider.

The next time the contactless card is used for authentication, a different counter value may be selected producing a different diversified symmetric key, making it difficult for malicious parties monitoring communications to decrypt communications. Both the service provider and the contactless card increment the counter according to a pre-determined increment pattern agreed upon by the parties. For example, the counters may increment by 1, or in a pattern, for example in increments of 1 for the first transaction, by 2 for the second, by three for the third, or by 5 for each transaction. Because the contactless card and service provider use a common counter, a common increment pattern, a common Master Key and a common cryptographic algorithm, even though the diversified key will change for each transaction, both the transmitting and receiving devices will have the same key.

As described above, in some examples, the key diversification value may be achieved using a counter value. Other non-limiting examples of the key diversification value include: a random nonce generated each time a new diversified key is needed; the full value of a counter value sent from the transmitting device and the receiving device; a portion of a counter value sent from the transmitting device and the receiving device; a counter independently maintained by the transmitting device and the receiving device but not sent between the two; a one-time-passcode exchanged between the transmitting device and the receiving device; and cryptographic hash of the counter. In some examples as described in the '119 Application, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the transmitting device and the receiving device. In effect, this may create a one-time use key, such as a single session key.

Various other symmetric encryption/decryption techniques that substituted for those described with regard to FIG. 6 are described in the '119 Application, incorporated herein by reference.

Figure 7:
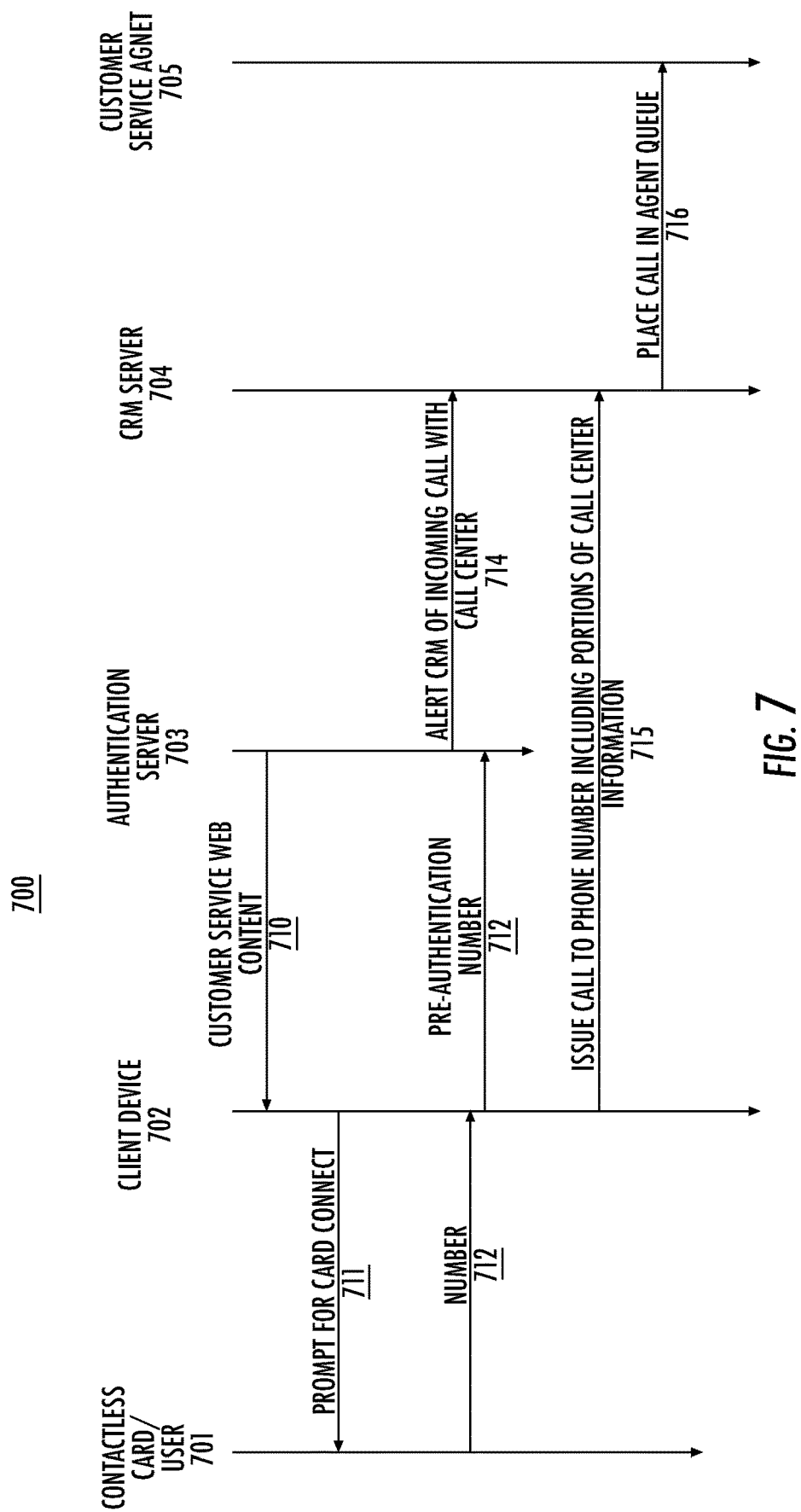
FIG. 7 is a data flow diagram provided to describe exemplary steps that may be performed during one embodiment of a call routing process which uses a contactless card of FIG. 2.
Figure 8:
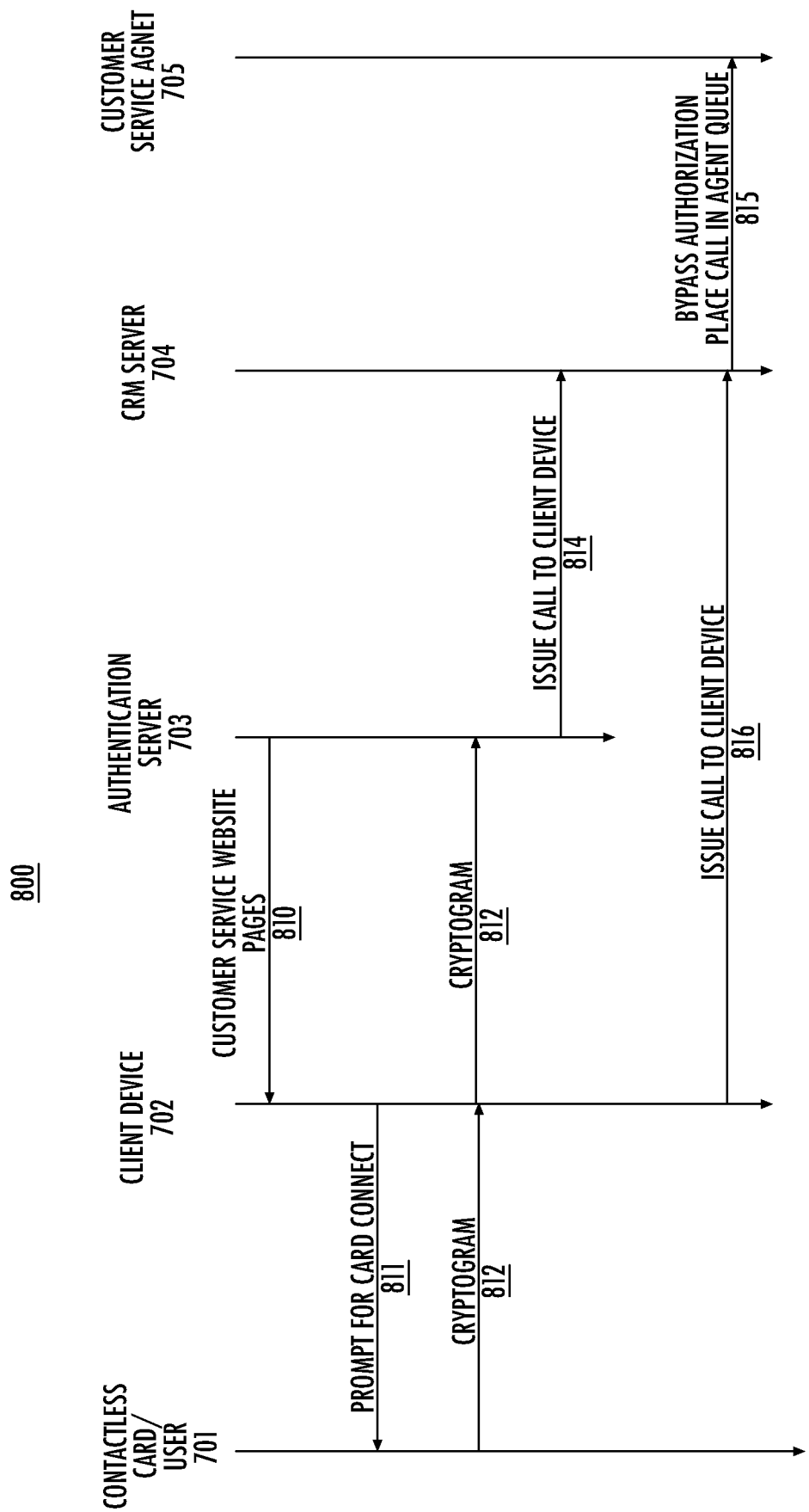
FIG. 8 is a data flow diagram provided to describe exemplary steps that may be performed during another embodiment of a call routing process which uses a contactless card of FIG. 2.

FIG. 7 and FIG. 8 each illustrate exemplary transaction flows that may be performed following pre-authentication of a client seeking access to call center services. In one embodiment, customer information stored on the contactless card may include call center information specific to the client. The call center information may include a number, for example. The number may comprise an IP address, phone number, or other contact address, random number or any portion or combination of an IP address, phone number or other contact address or random number. FIG. 7 illustrates exemplary messaging that may occur between components of a call routing process 700 using call center information from contactless card 701 to define a communication link between client device 702 and customer service agent 705.

Following a multifactor pre-authentication processes shown in FIG. 6, an authentication server 703 of the service provider populates the client interface with customer service web content 710. The web content may include contact information, the contact information comprising a URL, phone number or other contact address for communicating with the CRM server. When the link is selected, a communication link is generated between the client device and the CRM server. According to one embodiment, the customer service web content includes a prompt 711, requesting connection with the contactless card 701.

The contactless card 701, upon receiving the prompt, forwards a stored pre-authentication number 712 to the client device, which in turn provides it to the authentication server 703. In one embodiment, the stored pre-authentication number 712 includes a unique number associated with pre-authentication of a client device. At least a portion of the pre-authentication number may be appended to the contact information when the communication link is generated. For example, the web content 710 may include a link to a customer service phone number 1-800-123-4567. The contactless card may provide a pre-authentication number of 7777 which the client device appends the phone number. Client device initiates a call 715 over the cellular network to -800-123-4567, . . . , 7777. The application server alerts the CRM to an incoming call with the appended number from the contactless card at 714. The CRM monitors incoming calls for those with pre-authentication numbers, and bypasses authentication when placing calls at 716 in a customer service agent pipeline.

Although the process of FIG. 7 includes a pre-authentication number stored on a contactless card, in some embodiments a client device may be configured to generate the pre-authentication number for appending to call. The pre-authentication number may be generated in response to a communication with the contactless card, for example following a cryptogram exchange with the contactless card as described in FIG. 6. In some embodiments the pre-authentication number may change for each customer support request. Such an arrangement secures customer support calls against redirection by malicious parties, as imposter client device would not possess the pre-authentication numbers, and authentication thus would not be bypassed at the CRM server.

In other embodiments, as illustrated in FIG. 8, to further protect call handling from malicious interference, call handling is initiated by the customer service agent. Following pre-authentication using the process of FIG. 6, customer support web content 810 is provided to client device. In one embodiment, the content includes a prompt 811 to encourage re-authorization of the client device. Contactless card 812 generates a cryptogram as described above, which is forwarded via client device 702 to authentication server 703 for validation. Once the authentication server validates the cryptogram, at step 814 the authentication server directs the CRM server to bypass authorization of a call. At step 815 the call is placed in the call agent queue, bypassing authorization, and at step 816 CRM initiates a back-channel call. Here the back-channel call is a call initiated over a communication link established directly between a server (for example the CRM server) to the client device phone number, IP address, etc.

In some embodiments, the step of re-authentication may happen following initiating of the call at step 816 by the customer service agent 705, to ensure that the call was not re-directed between a previous authentication and call handling. Methods that may be used by a customer service agent to re-authenticate or further authorize client access will be described in more detail below. Such embodiments may be beneficial when there is a delay between a previous authentication and call handling, for example, a long wait in the customer service queue, or a scheduled call back.

Figure 9:
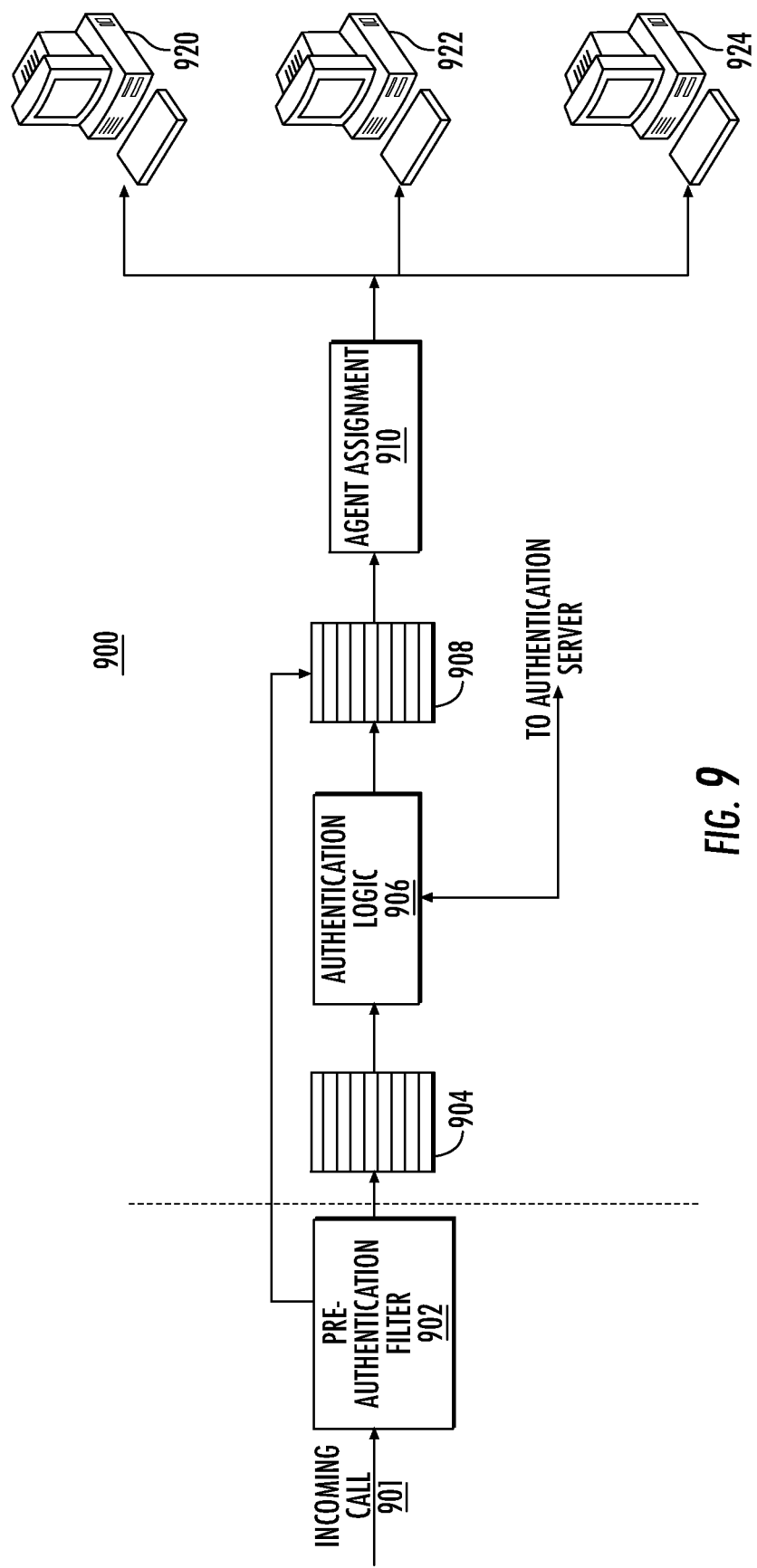
FIG. 9 is a block diagram illustrating exemplary call handling pipelines in a call service center that accepts pre-authenticated service requests.

FIG. 9 illustrates several exemplary components of one embodiment of a CRM service 900. CRM service 900 is shown to include authentication logic 906 and agent assignment unit 910. Incoming calls 901 are forwarded to a pre-authentication filter 902. Pre-authentication filter 902 may store pre-authentication numbers received from an authentication server as described above. Incoming calls which have not been pre-authenticated are forwarded to authentication queue 904. Authentication logic retrieves incoming calls from authentication queue 904 and cooperates with an authentication server (not shown) to validate clients using any combination of authentication methods described above. Once authenticated, calls are forwarded to queue 908.

Incoming calls that are determined to be pre-authenticated are forwarded directly from the pre-authentication filter 902 to the queue 908. Advantageously to minimize the potential for malicious interference, once a call having a stored pre-authentication number is bypassed in this manner, the pre-authentication number is deleted from the pre-authentication filter 902.

Queue 908 thus stores authenticated calls, which are assigned to agents 920, 922, 924 for handling by agent assignment unit 910 in accordance with resource loading. With such an arrangement, pre-authenticated calls can be intelligently routed at a customer call center to minimize handling delays.

Accordingly, a system and method have been described that leverage multi-factor authentication features of a service provider and intelligent call routing to increase security and efficiency at a customer call center. According to another aspect, it is realized that the advantages of the authentication processes described above may be further leveraged by the customer service agent during call handling. For example, the customer service agent may request increased levels of authentication to control client information access with finer granularity or to validate continued client authenticity. Although the multi-factor authentication process of FIG. 6 is described as beneficial for authenticating clients prior to allowing access to high-risk services, it is appreciated that even within high-risk services there are data and actions that pose greater potential to compromising a client account, and that should therefore have restricted access.

For example, there is a higher risk in disclosing an individual's account password than an individual's account balance. Further, there is a greater risk in allowing an individual to modify a phone number or email, as these contact measures are typically used during password modification, and if a malicious user were to modify these data, access to the account by the proper client may be lost.

Figure 10:
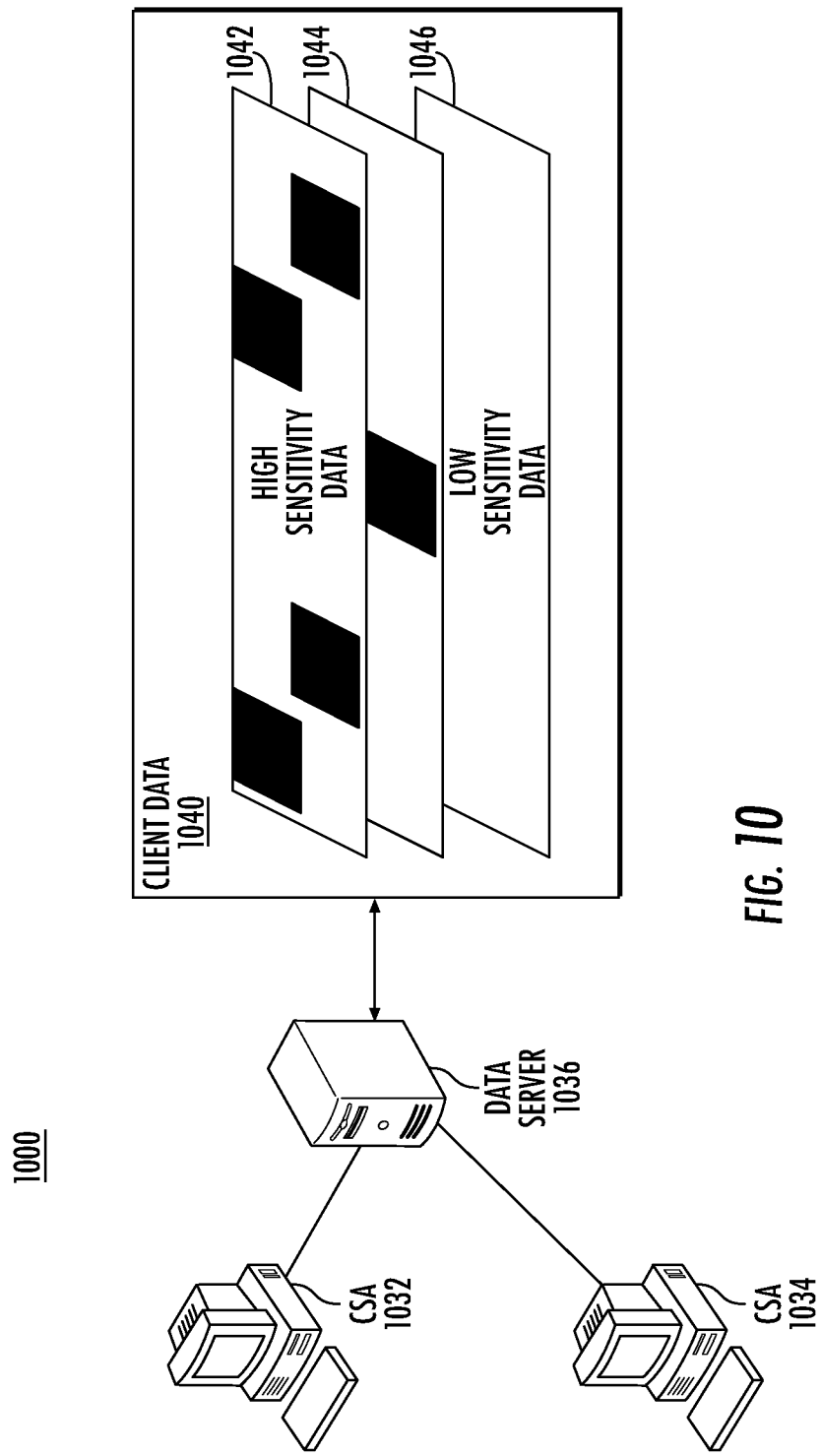
FIG. 10 is a block diagram provided to illustrate layered security controls that may be provided to client data.

Referring briefly to FIG. 10, a block diagram of a subset of exemplary components of a system 1000 operating according to aspects of the invention may comprise a plurality of customer service agents (CSA) 1032, 1034 which access client data 1040 using a data server 1036. The client data 1040 is conceptually apportioned into a tiered data structure, including high sensitivity data 1042, medium sensitivity data 1044 and low sensitivity data 1046. Each tier is thus associated with a different level of data sensitivity and concomitantly a different degree of access control. In some embodiments, certain sensitive data may be made unavailable to unauthorized parties as indicated by the shaded data items such as data item 1045.

Accordingly, prevent account takeover fraud, in one embodiment a customer service agent (or software executing on a customer service agent workstation) may proactively request further factor authentication during a call. For example, the customer service agent may affirmatively select a button on a graphic user interface (GUI) dashboard to generate a request to an authentication server to execute an authentication process. Alternatively, the customer service may select a data element on a screen that is indicated as having restricted access, and the selection may proactively result in the generation of further factor authentication.

The generated further factor authentication request may take many forms that preferably validate both that the device that has initiated the access request is associated with the client and is in the physical possession of the client (or someone authorized by the client). For example, a 'push' message may be issued by the authentication server to the client device, with the push message including a prompt that requests authentication data that is either personal to an authorized device or personal to an authorized client.

For example, such authentication methods may include, but are not limited to an in-application notification (such as the CaptialOne® SwiftID in app challenge), a Short Message Service (SMS) code exchange and the contactless card authentication process described with regard to FIG. 6.

A SwiftID in-application challenge authenticates clients by capturing, at registration, an image of the client's phone. Clients swipe their phone screen upon receipt of a push notification from the authentication server to confirm their activity. SwiftID confirms authenticity by comparing the captured image of the phone to the registered image it has on file, validating the client upon correlation of the images. A SMS code exchange involves a unique code being pushed to pre-validated contact information for a client, and the client evidencing possession of the device by entry of the code in a service provider app.

As described with regard to FIG. 6, contactless card authentication methods use NFC communication channels as described above to exchange messages with the contactless card the contactless card cooperates to provide second factor authentication through a combination of symmetric keys, symmetric cryptographic processing, and counters.

Figure 11:
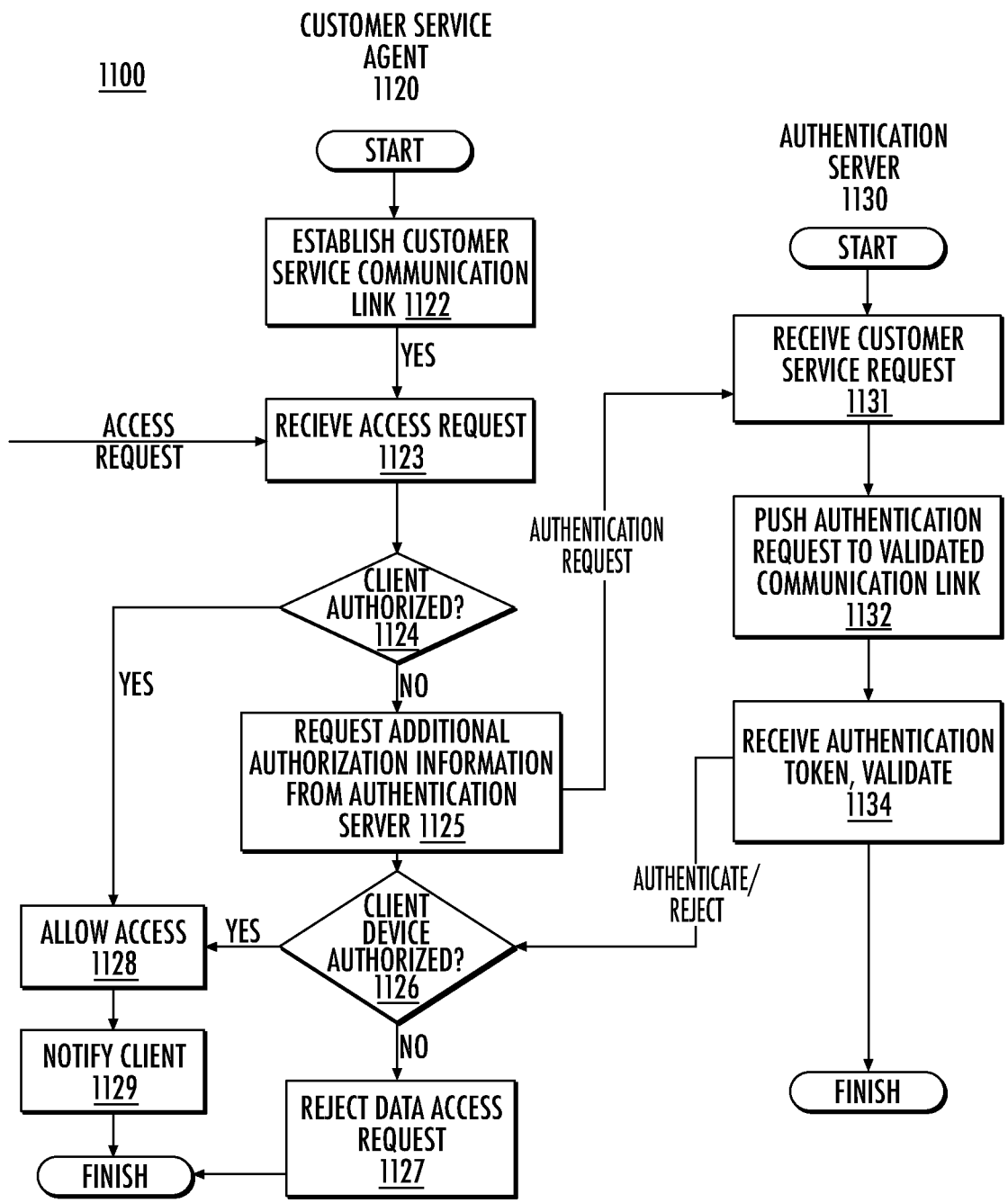
FIG. 11 is a flow diagram provided to describe exemplary steps that may be performed by a customer service agent and authorization service in one embodiment.

Referring now to FIG. 11, exemplary steps that may be performed in one embodiment of a customer service authentication process 1100 utilizing aspects of the present invention will now be described. The customer service authentication process may be implemented as a software program operating on a workstation of a customer service agent that operates in response to inputs from the customer service agent to execute the steps of the process of FIG. 11. For the purposes of the description below, operations described as performed by the customer service agent are meant to include those performed both by an operator of the software and by the software itself.

At step 1122 the customer service agent 1120 establishes a communication link with a client, for example using the process described with regards to FIGS. 1-9 where preferably the client is pre-authenticated prior to call handling.

At step 1123 the customer service agent 1120 receives an access request from the client. At step 1124 the customer service agent determines whether the client is authorized for the access. As mentioned previously, it is appreciated that there may be multiple levels of authorization associated with client data, where lower risk data, services or functions may be made more freely accessible than higher risk data, services or functions. Thus, the pre-authentication that has already been performed may be sufficient for customer service call handling, or additional authentication may be desired. However, in some situations, such as changing an email address or phone number, such pre-authentication may not be sufficient. According to one aspect, each attempted access has associated therewith an authorization level that must be satisfied before the access is permitted.

In some embodiments, the authentication server may store, for each client, an authorization level for the client. In one embodiment, the authorization level may be represented as a numerical scale, and a value may be stored for each client as part of client data that is stored as client data in database 130.

At step 1124, the customer service agent determines whether the client is authorized for the requested access by comparing the authorization level of the access request to the authorization level of the requesting client. If the client is authorized, then the process proceeds to step 1128, where the access is permitted. For example, in some embodiments approval of such access may make sensitive information visible to one or both of the customer service agent and the client. In other embodiments, approval may unlock data fields, allowing modification.

At step 1129, a notification is forwarded to the client. In one embodiment, the notification is forwarded to a pre-verified contact address of the client, for example, an email sent to a pre-validated email address or a text message sent to a pre-validated phone number. Preferably the communication channel used to forward the notification differs from the communication channel used by the client to request the access to information. For example, a client may request access using a web application, and the notification may be sent to an email address supported by an independent mail application. Providing notification to the client using a different communication channel helps to reduce the opportunity for a malicious third party to pose as the client to gain access. Although the notification step 1129 is shown to occur following access at step 1128, in various embodiments such notification may occur prior to permitting access, with a delay to allow for remediation in the event that the client did not issue such request.

If, at step 1124, it is determined that the initial pre-authorization is insufficient for the requested access, at step 1125 the customer service agent requests additional authentication from the server and processed to step 1126 to await authentication results.

At step 1131, when the authentication server receives the authentication request, at step 1132 the authentication server pushes an authentication request to the client. According to one aspect, a back-channel communication link may be established between the authentication server and the client device using a pre-validated communication channel. For example, the authentication server may store for one or more pre-validated contact information for each client, including but not limited to phone numbers, Internet Mobile Equipment Identifier (IMEI), Internet Protocol (IP) addresses, etc. A 'push' request may be sent to the client using the pre-validated contact information, where a 'push' request includes a request for a particular form of authentication information (i.e., SwiftID, SMS code, cryptogram, etc.). By pushing the authentication request to the client using a different channel than that over with the client seeks access, the opportunity for an imposter to be granted access to sensitive information is reduced.

In addition to pushing to pre-validated contacts, alternatively in some embodiments the push message and associated authentication response may be exchanged between the client and the authentication server using a session identifier associated with the client/customer service agent communication session. A session ID is a unique number that a web site's server assigns to a client for the duration of that client's visit (session). Because it is a unique time limited value, it is often difficult for hackers to successfully decode and intrude upon session communications. The session ID can be stored as a cookie, form field, or URL (Uniform Resource Locator) at both the customer service agent and client devices. Many servers use algorithms that involve more complex method of generating session identifiers, and thus forwarding communications using the session identifier adds a further layer of security to client/customer service agent communications.

At step 1134, the authentication server 1130 receives an authentication token (i.e., phone image, SMS code, cryptogram) which is used to authenticate the client device. The authentication server 1130 compares the token to an expected value retrieved from the data store and forwards one of an Authenticate or a Reject signal to the customer service agent.

If at step 1126 the customer service agent receives a Reject signal, the client is not authenticated, and the process proceeds to step 1127, where the access request is rejected. In such an event, the customer service agent may seek alternate means of authentication, may terminate the call or may forward the call for fraud handling. If at step 1126 the customer service agent receives an Authenticate signal, the requested access is permitted at step 1128 and an email is forwarded at step 1129 to notify the client of the access request.

In some embodiments, the implementation of a requested modification may be delayed pending a response to the email from the client. For example, the email message may include a request for an affirmative indication from the client that the access request was authorized. In some embodiments, the email request may request further authentication, for example, a SwiftID, SMS code or cryptogram exchange.

FIG. 12A and FIG. 12B illustrate exemplary graphic user interface (GUI) displays of a customer service agent (CSA) 1232 and a client 1234 which may communicate using the processes described above with regard to FIG. 11. When a customer service agent receives a call for handling, the customer service screen 1220 may include a variety of fields that display information about the client, such as a username 1222, a password 1224 and a social security number 1226. The client display 1250 may similarly include a subset of one or more of the information fields displayed to the customer service agent, including a username 1252, password 1254 and social security number 1256. According to one aspect, as mentioned above, certain information may not be viewable to one or both of the CSA 1232 and/or the client depending upon the authorization level of each of the entities. Thus, in FIG. 12A, the CSA 1232 is not authorized to view the client's password 1224 or social security number 1226. The client 1234, however, is authorized to view these fields. A lock icon 1258 indicates, however, that the client is not authorized to modify the field without further authentication. The process of further authenticating the client using the steps for example of FIG. 11 may be initiated in a variety of manners, including by the customer service agent selecting the Authenticate button 1260 on their display or by one or both of the CSA 1232 or the client 1234 selecting one of the lock icons such as lock icon 1258. In addition, as described above, at any point during call handling if the CSA 1232 is suspicious of the authenticity of the client, the CSA may select the Authenticate button 1260 to initiate the authentication process.

Accordingly, a system and method has been shown and described that reduces the opportunity for malicious access of client information during customer service transactions by validating client authenticity using multiple different communication channels. Such authentication may be performed following pre-authentication, or in place of pre-authentication.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for authenticating information access requests includes:
   a customer service interface configured to receive an authentication request associated with an access request received from a client device over a first communication channel, the authentication request to determine whether the device is authorized to access an information sought by the access request;
   a storage device configured to store client data comprising pre-verified contact information for the client device;
   a client interface configured to push a second factor authentication request to the client device over a second communication channel established using the pre-verified contact information, and to receive an authentication response from the client device, wherein the second communication channel is different from the first communication channel; and
   an authentication server, coupled to the customer service interface and client interface, for generating the second factor authentication request for a cryptogram from the client device, the cryptogram provided by a contactless card to the client device, and, in response to a match within a predetermined threshold between the authentication response and the stored client data, for selectively unlocking access to the information sought by the access request;
   the authentication server further comprising:
      a stored master key and a stored counter value associated with the contactless card; and
      decryption logic for decrypting a cryptogram received in response to the second factor authentication request using a diversified key generated using the stored master key and the stored counter value to obtain a decrypted counter value, and wherein the match is between the decrypted counter value and the stored counter value.

2. The system of claim 1 wherein the authentication server is further configured to notify the client device of the access request using a third communication channel generated in response to the pre-verified contact information for the client device.

3. The system of claim 1 wherein the second factor authentication request comprises at least one selected from the group of a contactless card cryptogram request, a Short Message Service (SMS) code request, and an in-application notification.

4. The system of claim 1 wherein the pre-verified contact information includes at least one selected from the group of an Internet Mobile Equipment Identifier (IMEI), a phone number of a pre-verified device, and an email address.

5. The system of claim 4 wherein the first communication channel comprises a session identifier.

6. The system of claim 5 wherein the second communication channel is further established using the session identifier.

7. The system of claim 6 wherein the client data comprises an authorization level of the client device, and the authentication server selectively validates the client device by comparing the authorization level of the client device to an access level of the information.

8. The system of claim 7 wherein the information includes at least one of account information, a password, an address, and a phone number, and the access request includes at least one selected from the group of a read request or a modify request.

9. A method for authenticating access requests includes the steps of:
  receiving an authentication request associated with an access request received from a client device over a first communication channel, the authentication request to determine whether the device is able to access information sought by the access request;
  retrieving client data including pre-verified contact information for the client device from a data store;
  pushing an authentication request to the client device over a second communication channel using the pre-verified contact information, the authentication request comprising a request for a second factor authentication from the client device;
  receiving a second factor authentication response from the device over the second communication channel, the second factor authentication response comprising a cryptogram received from a contactless card to the client device;
  comparing the second factor authentication response to the client data; and
  selectively authenticating the client in response to the step of comparing, including selectively unlocking access to the information sought by the access request by:
    generating a diversified key from a stored master key and a stored counter value associated with the contactless card; and
    decrypting a cryptogram received in response to the second factor authentication request using the diversified key to obtain a decrypted counter value, and wherein the comparing is between the decrypted counter value and the stored counter.

10. The method of claim 9 further including the step of notifying the client device of the access request using a third communication channel established in response to the pre-verified contact information.

11. The method of claim 10 wherein the first communication channel comprises a session identifier.

12. The method of claim 11 wherein the pre-verified contact information comprises at least one selected from a group of an Internet Mobile Equipment Identifier (IMEI) and a phone number of a pre-verified client device and an email address of the client.

13. The method of claim 12 wherein the step of pushing an authentication request uses the session identifier in conjunction with the pre-verified contact information to form the second communication channel.

14. The method of claim 9 wherein the authentication request comprises at least one selected from a group of a contactless card cryptogram request, a Short Message Service (SMS) code request, and an in-application notification.

15. The method of claim 9 where the step of selectively authenticating comprises the step of determining an access level for the information.

16. The method of claim 15 wherein the step of selectively authenticating comprises the step of determining an authorization level of the client device and comparing the authorization level of the client device against the access level of the information.

17. A method for authenticating information access requests received by a customer service agent includes the steps of:
  receiving an authentication request associated with an access request received over a first communication channel from a client device, the first communication channel including a session identifier, the authentication request to determine whether the client device is permitted to access information sought by the access request;
  retrieving pre-verified client contact information for the client device from a data store;
  pushing an authentication request to the client device using a second communication channel established using the pre-verified client contact information, the second communication channel differing from the first communication channel, the authentication request including a request for a cryptogram from a contactless card of the client;
  authenticating the access request including the steps of:
    receiving the cryptogram from the client device over the second communication channel, the cryptogram received from a contactless card engaged with the client device;
    decrypting the cryptogram using a diversified key generated using a stored master key and a stored counter value to provide decrypted counter value;
    comparing the decrypted counter value to the stored counter value;
    selectively authenticating the client device in response to the step of comparing, including selectively unlocking access to the information; and
    notifying the client device of the access request using a third communication channel generated in response to the pre-verified client contact information, wherein the third communication channel is different from both the first and second communication channels.

* * * * *